US005921727A

United States Patent [19]
Depperman

[11] Patent Number: 5,921,727
[45] Date of Patent: Jul. 13, 1999

[54] REAMER WITH FRICTION RESISTANT LAYER AND METHOD FOR FORMING SAME

[75] Inventor: Warren B. Depperman, Lugoff, S.C.

[73] Assignee: Cogsdill Tool Products, Inc., Camden, S.C.

[21] Appl. No.: 09/008,901

[22] Filed: Jan. 20, 1998

[51] Int. Cl.⁶ .................................................. B23B 51/00
[52] U.S. Cl. ...................... 408/144; 76/108.1; 408/145; 408/227
[58] Field of Search .................................... 408/144, 145, 408/83, 199, 227, 713; 76/101.1, 108.1, 108.6, 115

[56] References Cited

U.S. PATENT DOCUMENTS

| | | |
|---|---|---|
| 2,360,385 | 10/1944 | Anderson . |
| 3,320,833 | 5/1967 | Andreasson . |
| 3,751,177 | 8/1973 | Faber ........................................ 408/200 |
| 4,133,089 | 1/1979 | Heymanns ............................... 29/90 R |
| 4,274,769 | 6/1981 | Multakh .................................. 408/145 |
| 4,279,550 | 7/1981 | Kress et al. ............................... 408/59 |
| 4,596,498 | 6/1986 | Kress ......................................... 408/83 |
| 4,766,040 | 8/1988 | Hillert et al. ............................ 428/552 |
| 5,125,772 | 6/1992 | Kress ......................................... 408/57 |
| 5,328,304 | 7/1994 | Kress et al. ............................... 408/83 |
| 5,458,754 | 10/1995 | Sathrum et al. ........................ 204/192 |
| 5,551,812 | 9/1996 | Basteck .................................. 408/145 |

FOREIGN PATENT DOCUMENTS

| | | |
|---|---|---|
| 410342 | 1/1991 | European Pat. Off. ............... 408/144 |
| 313138 | 7/1916 | Germany . |
| 1922131 | 11/1972 | Germany . |
| 514221 | 2/1955 | Italy ......................................... 408/59 |
| 221210 | 11/1985 | Japan ..................................... 408/199 |
| 88115 | 3/1990 | Japan ..................................... 408/144 |
| 858800 | 1/1961 | United Kingdom . |
| 1435339 | 5/1976 | United Kingdom ................... 408/181 |

OTHER PUBLICATIONS

Horsfall, Tethrahedral Amorphous Carbon Coatings—Properties, Application and Commerical Successes, Conference: CVD Diamond & DLC Coatings and Thick Film Markets. pp.1–20.

Diamonds in Industry, Syndite PCD Wear Resistant Parts, select pp. 1–12.

Catalogue 600–2, Cogsdill Tool Products, Inc., Shefcut Precision Reamers and Fine Boring Tools.

*Primary Examiner*—Daniel W. Howell
*Attorney, Agent, or Firm*—Howard & Howard

[57] ABSTRACT

A reamer for finish machining a bore formed in a workpiece and method for providing a reamer with an abrasion resistant material. The reamer includes a body defining an outer surface, a cutting blade and guide member each coupled to the body, and an abrasion resistant material coupled to the reamer to form a friction resistant layer having a contact surface thereon. The abrasion resistant material impregnates the reamer to define an intermediate layer of abrasion resistant material intermixed with the reamer. The method includes the steps of assembling the reamer, applying an abrasion resistant material to said reamer, and allowing the abrasion resistant material to impregnate the reamer to define an intermediate layer of abrasion resistant material intermixed with the reamer.

15 Claims, 2 Drawing Sheets

REAMER WITH FRICTION RESISTANT LAYER AND METHOD FOR FORMING SAME

BACKGROUND OF THE INVENTION

1. Technical Field

The present invention relates generally to a wear resistant material on a cutting tool and, more particularly, to an amorphous carbon wear resistant material for a reamer.

2. Discussion

Reamers are commonly used to finish a circular passage formed in a workpiece by removing a thin layer of material from the passage wall. Standard reamer configurations include a cutting blade protruding radially outwardly an adjustable distance from the periphery of the reamer and several guide members positioned about the periphery of the reamer body to contact the inner surface of the workpiece during operation. The guide members locate the reamer within the bore so that the axis of rotation of the reamer is substantially aligned with the longitudinal axis of the passage.

The guide members of most reamers are provided with an abrasion resistant surface in order to reduce the magnitude and adverse effects of frictional forces developed between the contact surface of the guide member and the passage wall. The surface provides a contact area on the guide member that has a reduced coefficient of friction, minimizes material build-up, and increases the operational life of the guide member. Commonly, pads formed of a material with high hardness and a low coefficient of friction such as a ceramic or poly-crystalline diamond (PCD) are brazed or otherwise connected to a guide member to define the contact surface of the guide member.

Concerns over tool life and the quality of the reamed surface remain for many such guide members. Moreover, it is difficult and expensive to produce a tool having wear resistant pads brazed or otherwise connected to the guide members. Accordingly, a need exists for an abrasion resistant material that may be simply and economically provided to a reamer to define a guiding contact surface with an adequate service life.

SUMMARY OF THE INVENTION

The present invention provides a reamer for finish machining a hole formed in a workpiece. The reamer includes a cutting element, a guide member, and an amorphous carbon material forming a contact surface on the reamer. The amorphous carbon material impregnates the reamer to define an intermediate layer of carbon material intermixed with the reamer. The invention also includes a method for forming a reamer with an abrasion resistant coating including the steps of assembling the reamer, applying an amorphous carbon material thereto, and allowing the carbon material to impregnate the reamer to define an intermediate layer of carbon material intermixed with the reamer.

Advantageously, the comparatively high hardness and low coefficient of friction of the material defining the contact surface of the present invention increases the service life of a reamer.

Another advantage of the reamer of the present invention is its relatively inexpensive manufacturing costs when compared to reamers having abrasion resistant pads known in the art. This advantage is realized both in terms of material costs as well as manufacturing costs associated with applying the abrasion resistant material to the reamer.

A still further advantage of the reamer is that it includes an abrasion resistant material that is applied directly to the reamer guide member either before or after the guide member is coupled to the reamer body. Moreover, the amorphous carbon material of the present invention roots into the reamer to form an intermediate layer where the carbon material is intermixed with the guide member. The growth of the carbon material into the guide member strongly adheres the resistant layer to the reamer.

Yet another advantage of the reamer of the present invention is that selected portions of the reamer including but not limited to the reamer guide members, may be provided with the amorphous carbon material thereby allowing the application of the material to occur late in the manufacturing process. The potential for contact surface damage during production is minimized by reducing the production steps that follow application of the carbon material.

BRIEF DESCRIPTION OF THE DRAWINGS

Other objects and advantages of the invention will become apparent to one skilled in the art upon reading the following specification and subjoined claims and upon reference to the drawings in which:

DETAILED DESCRIPTION

Figure 1:
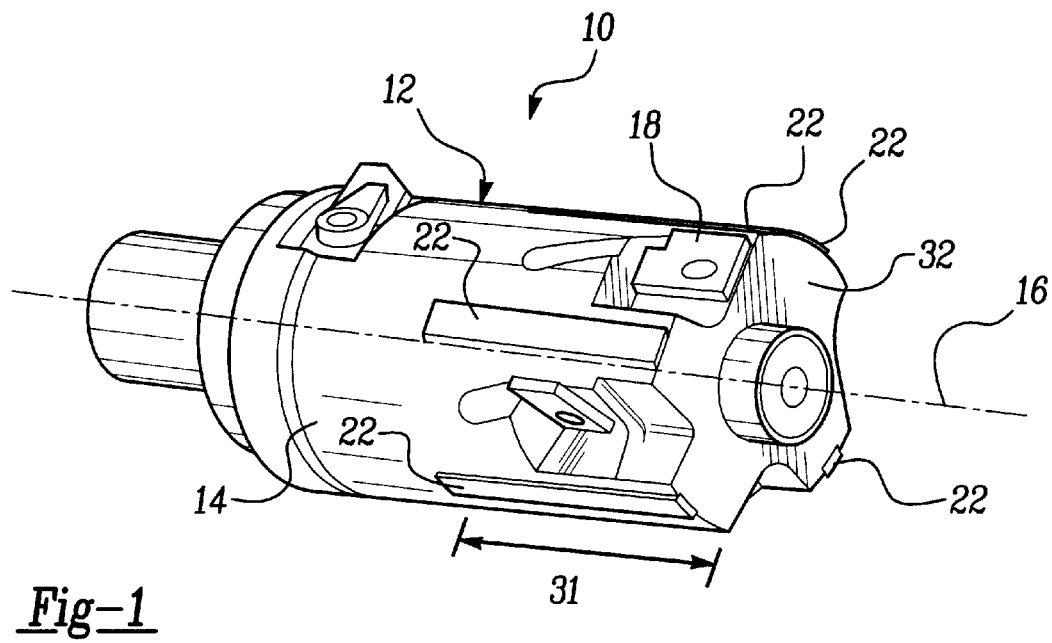
FIG. 1 is a perspective view of a reamer according to a preferred embodiment of the present invention.
Figure 2:
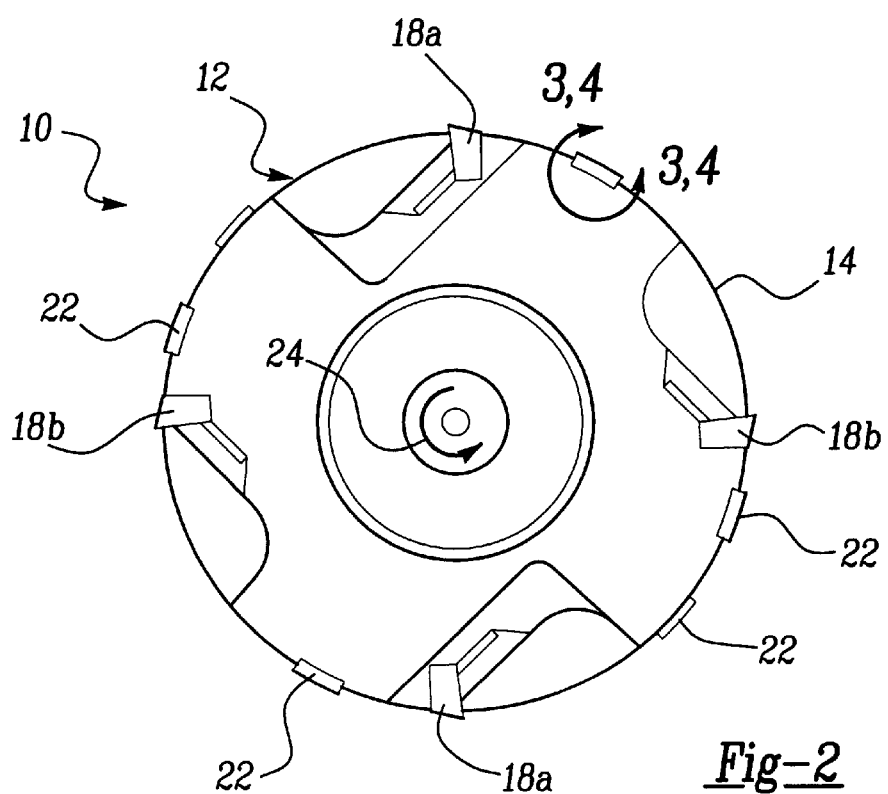
FIG. 2 is a front elevation view of the reamer shown in FIG. 1.

Referring now to FIGS. 1 and 2, a reamer 10 in accordance with an embodiment of the present invention is shown to include a body 12 defining an outer surface 14 that is preferably cylindrical in shape and concentric about a longitudinal axis 16. Cutting elements 18 (FIG. 1) extend radially beyond outer surface 14 and, in the preferred embodiment, are movably coupled to reamer body 12 to allow adjustment of the reamer cutting diameters. Guide members 22 are selectively located about and coupled to body 12 so as to effectively position reamer 10 within a bore formed in a workpiece (not shown).

The reamer illustrated in FIG. 2 includes a first pair of opposed cutting elements 18a forming a first cutting diameter and a second pair of opposed cutting elements 18b forming a second cutting diameter. As will be apparent to those skilled in the art, reamer 10 is configured to rotate in a counter-clockwise direction as indicated by arrow 24 and a guide member 22 is coupled to body 12 proximate to and rotationally following each cutting element. As illustrated, additional guide members may be provided as necessary to optimize the performance of reamer 10. Those skilled in the art will appreciate that the specific reamer configuration recited above may be modified without departing from the proper scope of the present invention as defined by the appended claims.

Figure 3:
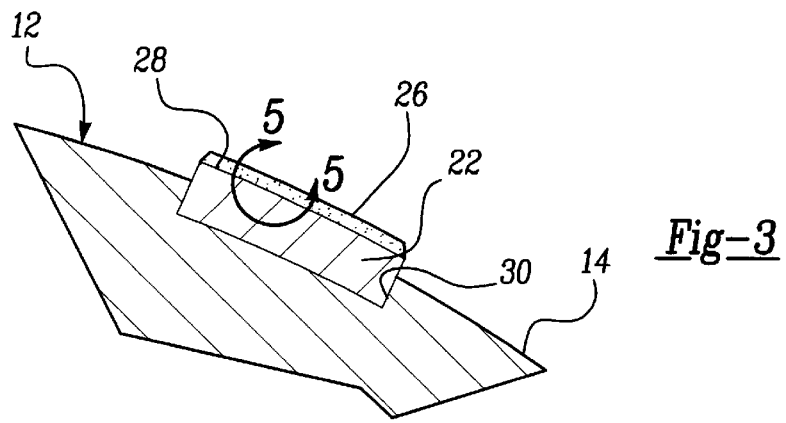
FIG. 3 is an enlarged partial sectional view taken at the location indicated by line 3—3 shown in FIG. 2 and illustrating the amorphous carbon material disposed on a reamer guide member.

FIG. 3 illustrates that each guide member 22 preferably includes a friction resistant layer 26 on a radially outer surface 28 thereof. Guide member 22 is disposed within a longitudinal groove 30 formed in and extending along outer surface 14 and is coupled to body 12 by brazing or any number of equivalent techniques recognized in the art.

Figure 4:
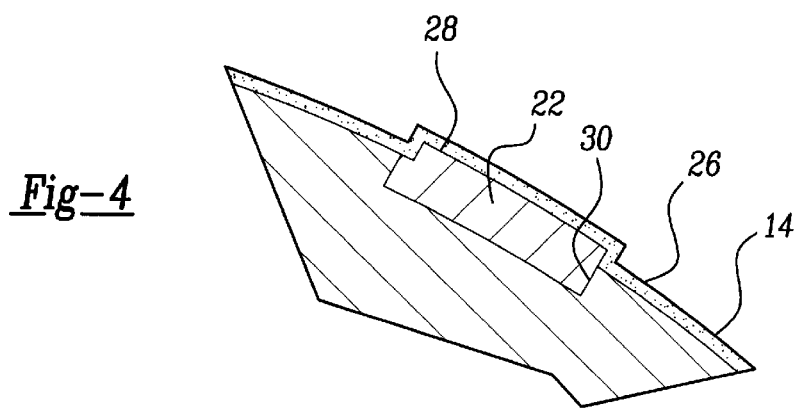
FIG. 4 is an enlarged partial sectional view taken at the location indicated by line 4—4 shown in FIG. 2 and illustrating the amorphous carbon material disposed on the outer surface of the reamer body as well as a guide member.

It is contemplated that friction resistant layer 26 may be selectively provided to the guide members as shown in FIG. 3 as well as to other areas of reamer 10 as shown in FIG. 4. For example, the layer 26 may be applied to the entirety or selected portions of outer surface 14 of reamer body 12 (FIG. 4), an abutment face 32 (FIG. 1), and/or cutting elements 18a and 18b. The application of the abrasion resistant material defining layer 26 may advantageously occur late in the manufacturing of reamer 10 thereby limiting the opportunity for the layer 26 to be damaged during the manufacturing process. Moreover, layer 26 protects outer surface 14 from damage caused by abrasion or corrosion. It is further contemplated that in order to minimize material costs it may be desirable to apply resistant layer 26 to only a portion of the outer surface 14 of reamer body 12 such as, for example, a contact zone 31 that is shown in FIG. 1 to include that portion of the reamer body that is forward of the rearward most part of guide members 22.

The carbon material defining layer 26 is preferably an amorphous carbon material that may include a hydrogenated amorphous carbon material such as that produced by Diamonex, Inc. of Allentown, Pa. as well as a non-hydrogenated amorphous carbon material such as that produced by TETRABOND®, a division of Multi-Arc, Inc. of Rockaway, N.J. In either instance, it is preferred that the carbon material is in an amorphous state during application. The non-hydrogenated coating material manufactured by TETRABOND® is commonly referred to as an ionic carbon, amorphous carbon, amorphous diamond, and tetrahedral amorphous carbon material. The primary indicator of the non-hydrogenated carbon material is the lack of a significant amount of hydrogen. The non-hydrogenated material is approximately twice as hard as the hydrogenated carbon and generally will survive service temperatures of about 360° Fahrenheit higher than the hydrogenated material. These features make the non-hydrogenated material the material of choice for most applications.

As indicated above, the carbon material may be applied to define layer 26 late in the production process thereby minimizing the potential for damage to the layer. The material may be applied through many methods known in the art including laser ablation, ion beam deposition, filter arc, and enhanced arc deposition. By way of example, the enhanced arc deposition technique is illustrated in U.S. Pat. No. 5,458,754 entitled "Plasma Enhancement Apparatus And Method For Physical Vapor Deposition" and issued Oct. 17, 1995 to Sathrum et al., the disclosure of which is incorporated herein by reference. Once deposited on the reamer, the carbon material impregnates or roots into the substrate layer 38 resulting in the formation of a three layer configuration including the outer layer 26 of resistant material, a layer 38 of substrate, and a layer 34 of resistant material intermixed with the substrate as discussed in detail below with reference to FIG. 5. As a result, layer 26 exhibits excellent adherence to the substrate, e.g. reamer 10 and/or guide members 22. Moreover, the coating can be applied directly to the reamer body 12 and/or guide members 22 thereby reducing manufacturing complexity and costs.

A further advantage of the present invention is that when the layer 26 is formed on the reamer guide member, the abrasion resistant material defining layer 26 can be applied either directly to the hardened steel guide member substrate or to the wear-resistant pads that are commonly coupled to reamer guide members such as the pads disclosed in U.S. Pat. No. 4,596,498 entitled "Single Bit Reamer With Improved Guide Members" issued Jun. 24, 1996. In either application, layer 26 increases the service life of the guide member. Moreover, applying the abrasion resistant material directly to the steel substrate of the guide member eliminates carbide to steel brazing and the costs and manufacturing concerns associated therewith. While use of layer 26 with a hardened steel guide member 22 is generally not as robust as a carbide or diamond padded guide member, the economic savings and manufacturing simplicity realized by the present invention are attractive for certain applications.

The general tribological properties of a non-hydrogenated amorphous carbon layer (Ta—C), a CVD (Chemical Vapor Deposition) diamond layer of actual crystalline diamonds, and a hydrogenated amorphous carbon layer (HDLC) are set forth in Table A. Those skilled in the art will appreciate that selection of an appropriate carbon layer, either HDLC or Ta—C, depends on the particular application for the cutting tool. Specifically, it is contemplated that use of the hydrogenated coating (HDLC) is desirable in less harsh environments or instances where the service life of the guide pad is of less concern than its cost.

TABLE A

| | CVD Diamond | HDLC | Ta—C |
|---|---|---|---|
| Hardness (GPa) | 80–100 | 10–50 | 80–100 |
| Densite (g/cm³) | 3.2–3.4 | 1.7–2.2 | 3.0–3.2 |
| Friction Coefficient | 0.1 (Polished) | =0.1 | =0.1 (50% humidity) |
| Film Roughness | 3 μm < 0.1 μm up to 15 μm as deposited | optically smooth | optically smooth |
| Adherence to Substrate | Low | Moderate | High |
| Processing Temperature | >600° C. | 20° C.–325° C. | 20° C.–150° C. |
| Structure | Crystalline | Amorphous | Amorphous |
| Reactive | Yes | Yes | None |

While a specific embodiment of a reamer with an abrasion resistant layer of hydrogenated or non-hydrogenated amorphous carbon material defining a contact surface has been illustrated and described herein, those skilled in the art will appreciate that the layer may be used on a variety of reamer configurations without departing from the proper scope of the invention as defined by the appended claims. Additionally, those skilled in the art will appreciate that various portions of a reamer may be provided with the layer of carbon material in order to increase the overall effectiveness of the reamer. Accordingly, the specific reamer configuration and carbon layer locations illustrated herein are provided for illustrative purposes only and are not intended to limit the scope of the invention defined by the appended claims.

A method for forming a reamer with an amorphous layer will now be described in greater detail. Initially, the various components of a reamer, such as that illustrated in FIGS. 1 and 2, are assembled in a manner generally known in the art. This initial assembly may or may not include the coupling of guide members 22 to the body 12 of the reamer. An amorphous carbon material is applied to the entirety of, or selected portions of, reamer 10 as described above to define layer 26. It is specifically contemplated that the amorphous carbon material is applied at least to the outer surface 28 of guide members 22 (FIG. 3) either before or after the guide members are coupled to the reamer body 12. It should be appreciated that, as generally illustrated in FIG. 4, the layer 26 may also cover a portion of outer surface 14 of reamer body 12 such as within contact zone 31 (FIG. 1). Moreover, the carbon material may also be applied to the cutting blades 18.

Figure 5:
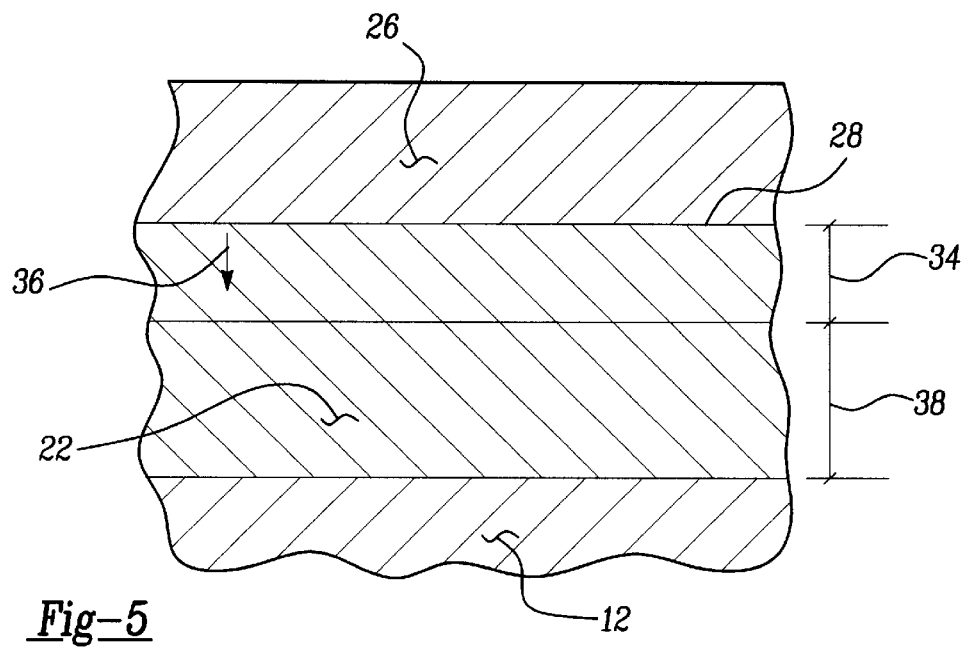
FIG. 5 is an enlarged partial sectional view taken at the location indicated by line 5—5 shown in FIG. 3.

When the amorphous carbon material is applied to the reamer, such as the guide member 22 illustrated in FIG. 5, the material contacts the outer surface 28 thereof and impregnates the guide member by rooting into the interstices within guide member 22. More particularly, as will be appreciated by those skilled in the art, while guide member is a solid material it does include a multitude of microscopic passages communicating with outer surface 28. After application to surface 28, the amorphous carbon material impregnates these passages. The infusion of amorphous carbon material into the guide member creates a three layer configuration that includes an intermediate layer 34, resistant layer 26, and substrate layer 38. In the intermediate layer 34, the carbon material is intermixed within the passages of the guide member 22. The concentration of carbon material within intermediate layer 34 generally decreases While the adhesion of the 36.

While the adhesion of the carbon material to a substrate is described above with reference to guide member 22, it will be appreciated that a similar intermediate layer is created when the carbon material is applied to other reamer components such as various guide pads commonly coupled to guide members 22 including guide pads formed of TiC-TiN, ceramic, synthetic diamond, and the like. As a result, the amorphous carbon material described herein may be used to economically yet securely provide an abrasion resistant layer to various parts of a reamer to increase the service life of the specific parts of the reamer as well as the reamer as a whole.

Various other advantages and modifications will become apparent to one skilled in the art after having the benefit of studying the teachings of the specification, the drawings, and the followings claims.

What is claimed is:

1. A reamer having a body defining an outer surface, a cutting blade and a guide member each coupled to said body, and an abrasion resistant material coupled to said reamer to form a contact surface, said abrasion resistant material impregnating said reamer to define an intermediate layer of abrasion resistant material intermixed with said reamer.

2. The reamer of claim 1 wherein said abrasion resistant material is coupled to said cutting blade and impregnates said cutting blade to define said intermediate layer of abrasion resistant material wherein said abrasion resistant material is intermixed with said cutting blade.

3. The reamer of claim 1 wherein said abrasion resistant material is coupled to said guide member to form said contact surface and impregnates said guide member to define said intermediate layer of abrasion resistant material, said abrasion resistant material is intermixed with said guide member.

4. The reamer of claim 1 wherein said abrasion resistant material is an amorphous carbon material.

5. The reamer of claim 4 wherein said amorphous carbon material is a non-hydrogenated amorphous carbon material.

6. The reamer of claim 4 wherein said amorphous carbon material is a hydrogenated carbon material.

7. A method for forming a reamer with an abrasion resistant material comprising the steps of:

assembling a reamer including a body, a cutting blade and a guiding contact surface;

applying an abrasion resistant material to said reamer; and allowing said abrasion resistant material to impregnate said reamer to define an intermediate layer of abrasion resistant material intermixed with said reamer.

8. The method of claim 7 wherein the step of applying said amorphous carbon coating to said reamer follows the step of assembling said reamer.

9. The method of claim 7 wherein the step of assembling said reamer includes coupling said cutting blade to said body and coupling a guide member to said body.

10. The method of claim 9 wherein the step of applying said abrasion resistant material to said reamer includes applying said abrasion resistant material to said guide member to define said guiding contact surface.

11. The method of claim 9 wherein the step of applying said abrasion resistant material to said reamer includes applying said abrasion resistant material to said cutting blade and to said guide member.

12. The method of claim 9 wherein said reamer defines a contact zone and wherein the step of applying said abrasion resistant material to said reamer includes applying said abrasion resistant material to said guide member and to said contact zone.

13. The method of claim 7 wherein said abrasion resistant material is an amorphous carbon material.

14. The method of claim 13 wherein said amorphous carbon material is a non-hydrogenated amorphous carbon material.

15. The method of claim 13 wherein said amorphous carbon material is a hydrogenated amorphous carbon material.

* * * * *